United States Patent [19]

Gotoh

[11] Patent Number: 4,491,754
[45] Date of Patent: Jan. 1, 1985

[54] CHARGING GENERATOR FOR CAR

[75] Inventor: Hitoshi Gotoh, Hyogo, Japan

[73] Assignee: Mitsubishi Denki Kabushiki Kaisha, Tokyo, Japan

[21] Appl. No.: 350,351

[22] Filed: Feb. 19, 1982

[30] Foreign Application Priority Data

Mar. 3, 1981 [JP] Japan ............................ 56-29817[U]
Mar. 10, 1981 [JP] Japan ............................ 56-34335[U]

[51] Int. Cl.³ .............................................. H02K 5/10
[52] U.S. Cl. ........................................ 310/88; 310/43; 310/45; 310/89
[58] Field of Search ....................... 310/88, 43, 89, 45, 310/66, 85, 71, 52, 53, 54, 58; 285/DIG. 22

[56] References Cited

U.S. PATENT DOCUMENTS 4,058,261 11/1977 Pollart ........................ 285/DIG. 22
4,104,551 8/1978 Blank ..................................... 310/88

FOREIGN PATENT DOCUMENTS 7228612 11/1972 Fed. Rep. of Germany ........ 310/89
2098823 2/1972 France .................................. 310/88
48-42567 12/1973 Japan .................................... 310/88
61704 5/1977 Japan .................................... 310/88
0158945 12/1932 Switzerland .......................... 310/88

Primary Examiner—R. Skudy
Attorney, Agent, or Firm—Oblon, Fisher, Spivak, McClelland & Maier

[57] ABSTRACT

A charging generator for a car comprises a recess formed at the lower portion of the fitting part of a rear bracket to a stator coil in which a drain hose is fitted.

2 Claims, 3 Drawing Figures

1

CHARGING GENERATOR FOR CAR

BACKGROUND OF THE INVENTION

1. Field of the Invention

The present invention relates to a charging generator for a car having a drainage and rust-resistance structure.

2. Description of the Prior Art

In the conventional generator of this kind, a hole is formed in the lower side of a rear bracket to fit a drain hose in order to effectively discharge undesirable substance such as salt water, mud water etc. entering into the rear bracket to the outside.

In the fitting of the drain hose, the following problems arise: (1) a machining operation is required to form a drain hole, (2) an accurate dimension for the drain hose is required whereby material used is limited, and (3) much labor time is required in the assembling operation in comparison with that for the other parts.

The structure of the conventional charging generator will be described with reference to FIG. 1. In the FIG. 1, the reference numeral (1) designates the rear bracket of a charging generator for a car, (1a) designates a ventilation hole for cooling formed in the rear bracket, (1b) designates a drain hole formed in the lower wall by machining operation and (2) designates a drain hose fitted to the drain hole.

In the conventional structure, undesirable substance such as salt water, mud water enters from the ventilation hole for cooling (1a) to the inside of the rear bracket to deposit on the lower wall. It is, therefore, necessary to form a drain hole (1b) by machining operation in order to discharge the undesirable substance outside. Further, it is necessary to fit a drain hose (2) in order to discharge it more effectively.

Various methods can be considered to fit the drain hose. In the first method, the drain hose (2) is forcibly fit to the drain hole (1b) to fix it. This method has advantages that an accurate dimensions are required for both the fitting parts and an additional operation of forcibly fitting is required.

In the second method, a drain hose (2) made of a soft rubber is inserted into the drain hole (1b). In this case, the material used is limited, the cost of the material is high and it is difficult to mechanize the assembling operation.

Where an electrical device is placed at the lower portion of the bracket, undesirable solidified substance of salt water, mud water etc. is deposited between the electric device and the inner wall of the rear bracket (1). Stray current corrosion caused by the deposition sometimes resulted in faulty generation of current.

SUMMARY OF THE INVENTION

It is an object of the present invention to overcome the disadvantages of the conventional charging generator and to provide a charging generator for a car which allows application of mechanization and saving material.

It is an another object of the present invention to provide a charging generator for a car for preventing occurrence of stray current corrosion.

The foregoing and the other objects of the present invention have been attained by providing a charging generator for a car in which a drain hose is fixed in a fitting part formed in the lower wall of the bracket adjacent to a stator core.

DETAILED DESCRIPTION OF THE PREFERRED EMBODIMENT

An embodiment of the present invention will be described with reference to FIG. 2.

Figure 1:
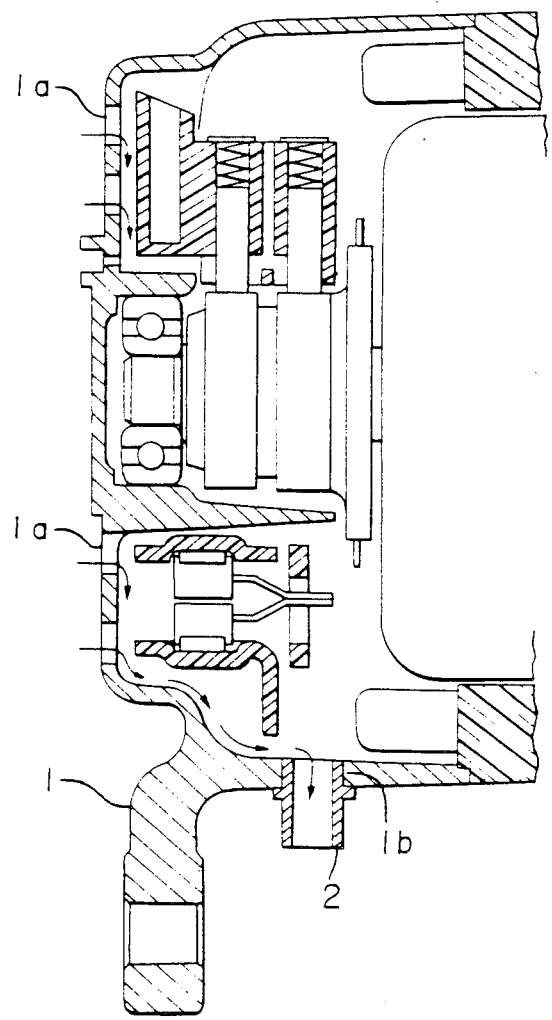
FIG. 1 is a cross sectional view showing the draining structure of the conventional charging generator for a car.
Figure 2:
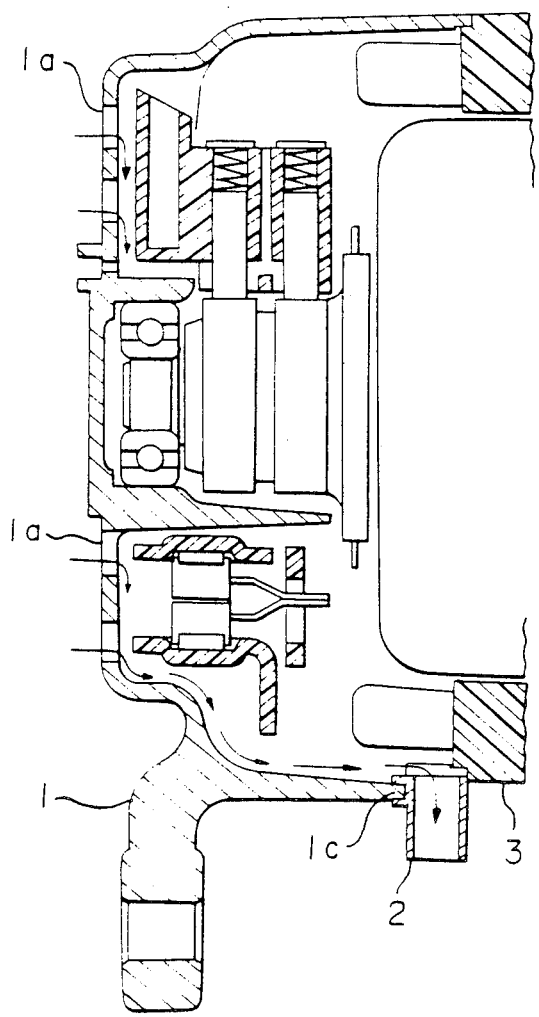
FIG. 2 is a cross sectional view of an embodiment of the draining structure of a charging generator for a car.

In the FIG. 2, the reference numeral (1) designates the rear bracket of a charging generator for a car, (1a) designates a ventilation hole for cooling formed in the rear bracket (1), (1c) designates a drain recess formed in the rear bracket, (2) designates a drain hose fitted to the drain recess (1c) and (3) designates a stator core adjacent to the rear bracket.

In the embodiment of the present invention, undesirable substance such as salt water, mud water etc., entering from the ventilation hole for cooling (1a) into the inside of the rear bracket (1) to deposit on the lower wall of the bracket, is discharged outside by forming the drain recess (1c) in the rear bracket (1) at the fitting part to the stator core (3). In order to discharge water more effectively, the drain hose (2) is fitted to the drain recess whereby the same effect as that of the conventional structure can be obtained. The drain hose (2) can be held by the recess (1c) and the end side surface or first edge of the stator core (3) by their clamping function.

As described above, in the present invention, a recess is formed at a fitting part to the stator core by resin-molding of the rear bracket instead of the drain hole of the conventional bracket which has been formed by machining operation. With this structure of the present invention, machining operation can be eliminated.

For fitting the drain hose, it can be clamped in the fitting part of the rear bracket adjacent to the stator core whereby mechanization can be easily applied and selection of material for the drain hose can be flexible. Thus, a drainage structure having these advantages can be obtained.

Figure 3:
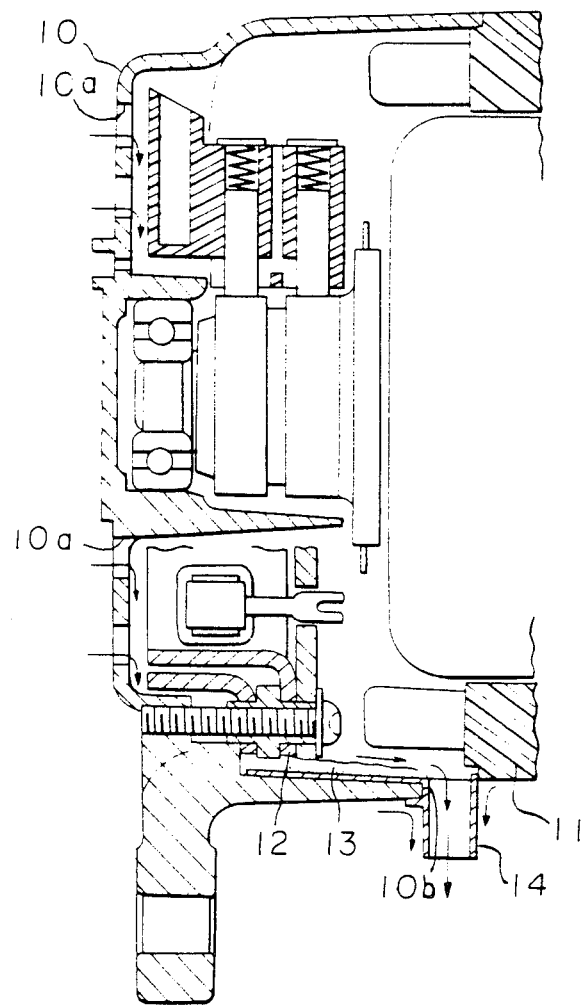
FIG. 3 is a cross sectional view of another embodiment of the present invention.

Another embodiment of the present invention will be described with reference to FIG. 3. In the FIG. 3, the reference numeral (10) designates the rear bracket of a charging generator for a car, (10a) designates a ventilation hole for cooling formed in the rear bracket, (10b) designates a drain recess formed in the rear bracket (10) at a position adjacent to a stator core (11), (12) designates an electric device placed at a lower portion inside of the rear bracket (10), (13) designates undesirable substance such as salt water, mud water deposited between the electric device and the rear bracket and (14) designates a tubular drain hose fitted to the drain hole and an interior insulating sheet which are molded in one piece.

In this embodiment, the undesirable substance such as salt water, mud water etc., entering from the ventilation hole for cooling (10a) into the rear bracket (10), which falls along the inner wall of the rear bracket to deposit on the bottom can be substantially discharged outside through the tubular drain hose (14) fitted to the drain hole (10b). The drain hose (14) intakes cooling air from the outside as separate ventilation hole for cooling (10a); on the other hand, it prevents to intake undesirable substance such as salt water, mud water etc. attached to the outer surface so that the substance naturally falls from the lower edge. Thus, the drain hose satisfactorily performs the function.

However, a small amount of undesirable substance (13) such as salt water, mud water entering from the outside may deposit between the electric device (12) placed at the lower part and the rear bracket (10). Even in such a case, electric corrosion can be prevented because the insulating sheet integrated with the drain hose (14) extends to be inserted between the electric device (12) and the rear bracket (10).

As described above, the charging generator in accordance with the embodiment comprises a drain hose with an insulation sheet molded in one-piece which is fitted to a recess formed in the rear bracket adjacent to a stator core. Thus, machining operation of the rear bracket can be eliminated, selection of material for the drain hose can be flexible and assembling operation of the drain hose can be easy. Furthermore, electric corrosion of the rear bracket can be prevented to improve durability of the charging generator for a car.

I claim:
1. A charging generator for a vehicle, comprising:
a cylindrical stator core having one axial end including a first edge;
a cylindrical rear bracket coaxial with said stator core and having one axial end including a second edge abutting said first edge of said stator core;
a recess formed in a lower portion of said one end of said bracket and extending from said second edge;
a drain hose fitted in said recess and clamped in said recess by said first edge of said stator core; said generator includes an electric device in said lower portion of said bracket, said electric device being spaced from said one end of said bracket, wherein said drain hose includes an insulating sheet covering an inner surface of said bracket between said electric device and said one end of said bracket; and a tubular hose portion unitary with said insulating sheet and projecting through said recess and out of said bracket.

2. The generator of claim 1 wherein said insulating sheet and said hose portion comprise a piece of molded material.

* * * * *